United States Patent
Mihailov

(10) Patent No.: US 8,727,613 B2
(45) Date of Patent: May 20, 2014

(54) METHOD AND SYSTEM FOR MEASURING A PARAMETER IN A HIGH TEMPERATURE ENVIRONMENT USING AN OPTICAL SENSOR

(75) Inventor: Stephen J. Mihailov, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 301 days.

(21) Appl. No.: 13/118,500

(22) Filed: May 30, 2011

(65) Prior Publication Data

US 2011/0292965 A1 Dec. 1, 2011

Related U.S. Application Data

(60) Provisional application No. 61/350,081, filed on Jun. 1, 2010.

(51) Int. Cl.
*G01K 15/00* (2006.01)
*G01J 5/00* (2006.01)

(52) U.S. Cl.
USPC ............... 374/131; 374/129; 374/161; 374/2; 374/141; 356/43

(58) Field of Classification Search
USPC ......... 374/120, 121, 130–132, 1, 2, 161, 141, 374/143, 129, 100; 356/43
See application file for complete search history.

(56) References Cited

U.S. PATENT DOCUMENTS

| | | | |
|---|---|---|---|
| 4,750,139 A | 6/1988 | Dils | 702/134 |
| 4,807,950 A | 2/1989 | Glenn et al. | 385/123 |
| 4,996,419 A | 2/1991 | Morey | 250/227.18 |
| 5,367,588 A | 11/1994 | Hill et al. | 430/5 |
| 5,381,229 A * | 1/1995 | Murphy et al. | 356/477 |
| 5,828,059 A | 10/1998 | Udd | 250/227.18 |
| 6,004,639 A * | 12/1999 | Quigley et al. | 428/36.3 |
| 6,188,507 B1 * | 2/2001 | Thomas | 359/305 |
| 6,345,909 B1 * | 2/2002 | Yam | 374/2 |
| 6,993,221 B2 | 1/2006 | Mihailov et al. | 385/37 |
| 7,031,571 B2 | 4/2006 | Mihailov et al. | 385/37 |
| 7,379,643 B2 | 5/2008 | Mihailov et al. | 385/120 |
| 7,529,434 B2 * | 5/2009 | Taverner et al. | 385/12 |
| 7,561,276 B2 * | 7/2009 | Boyd | 356/480 |
| 7,574,075 B2 * | 8/2009 | Xia | 385/12 |

(Continued)

OTHER PUBLICATIONS

Busch et al., "Inscription and characterization of Bragg gratings in single-crystal sapphire optical fibres for high-temperature sensor applications", Journal of Measurement Science and Technology, vol. 20, No. 11, pp. 115301, 2009.

(Continued)

*Primary Examiner* — Gail Verbitsky
(74) *Attorney, Agent, or Firm* — Teitelbaum & MacLean; Neil Teitelbaum; Doug MacLean

(57) ABSTRACT

A dual parameter sensor for sensing temperature and mechanical or chemical or related information is disclosed. The sensor is formed of an optical waveguide suitable for use in-situ in a high temperature environment having a Bragg grating written into a core region thereof with short-pulsed electromagnetic radiation. By noting the thermal Black Body radiation level above 650° C., wavelength shifts due to temperature can be decoupled from wavelength shifts due to the other parameter being sensed. Advantageously the thermal radiation can be used as an optical source to probe the Bragg grating, considerably simplifying the interrogating apparatus, removing the need for an extrinsic optical source to probe the sensor.

13 Claims, 15 Drawing Sheets

(56) References Cited

U.S. PATENT DOCUMENTS

| | | | |
|---|---|---|---|
| 7,606,452 B2 | 10/2009 | Bilodeau et al. | 385/43 |
| 2002/0021739 A1* | 2/2002 | Fraden | 374/2 |
| 2003/0216720 A1* | 11/2003 | Sinofsky | 606/11 |
| 2003/0228083 A1* | 12/2003 | Chen | 385/12 |
| 2006/0146909 A1* | 7/2006 | Morse et al. | 374/130 |
| 2006/0209291 A1* | 9/2006 | Yamate et al. | 356/73.1 |
| 2011/0290992 A1* | 12/2011 | Sato et al. | 250/253 |

OTHER PUBLICATIONS

Grobnic et al., "Multiparameter sensor based on single high-order fiber Bragg grating made with IR-femtosecond radiation in single mode fibers", Journal IEEE Sensors, vol. 8, No. 7, pp. 1223-1228 (2008).

* cited by examiner

METHOD AND SYSTEM FOR MEASURING A PARAMETER IN A HIGH TEMPERATURE ENVIRONMENT USING AN OPTICAL SENSOR

CROSS-REFERENCE TO RELATED APPLICATIONS

The present invention claims priority from U.S. Provisional Patent Application No. 61/350,081, filed on Jun. 1, 2010, incorporated herein by reference.

FIELD OF THE INVENTION

The present invention relates to a sensing apparatus and method for measurement of temperature and another parameter such as pressure, strain, displacement or index of refraction in a high temperature environment using optical fibers and more particularly to a an optical sensor inscribed therein capable of measuring temperature and at least one other parameter in harsh environment at very high temperatures. An aspect of the invention also relates to a preferred method of simplification of the sensing apparatus by using the enhanced black body radiation spectrum in the presence wavelength dependent element such as a Bragg grating as an inherent optical source for monitoring the spectral response of the Bragg grating.

BACKGROUND OF THE INVENTION

Fiber Bragg grating sensors (FBG sensors) have attracted considerable attention in sensing temperature and strain on an optical fiber due to the variation in the spectral response of the grating as a result of strain and temperature on the grating structure. FBG sensors offer important advantages such as electrically passive operation, immunity to electro-magnetic interference (EMI), high sensitivity and multiplexing capabilities. Fiber gratings are simple, intrinsic sensing elements which traditionally have been UV photo-inscribed into photosensitive Ge-doped silica optical fiber. Each FBG sensor has a characteristic retro-reflective Bragg resonance or Bragg wavelength $\lambda_{Br}$, which is dependent upon the periodicity of the grating within the fiber and the effective refractive index of the optical fiber. The FBG sensors can then easily be multiplexed in a serial fashion along a length of single mode fiber. When embedded into composite materials, optical fibers with an array of FBG sensors allow for distributed measurements of load, strain, temperature and vibration of the material creating what is commonly referred to as "smart structures" where the health and integrity of the structure is monitored on a real-time basis. The concept of using a Bragg grating as a sensing element was taught by Morey in U.S. Pat. No. 4,996,419.

The main sensing parameter monitored for FBG sensors is the resonant Bragg wavelength $\lambda_{Br}$ of the grating structure. Unfortunately it is often difficult to discriminate between different effects, for example temperature and stress, with a single FBG since the different effects can impact simultaneously on $\lambda_{Br}$. Often another Bragg grating in a favorable arrangement is used for each of the parameters involved in a particular case, but this procedure will result in a more complicated sensing configuration. For many applications it is desirable to have the capability to measure more than one effect from a single sensor element. For example Udd discloses in U.S. Pat. No. 5,828,059 the dual wavelength birefringent response from a single fiber grating in a birefringent optical fiber that can be used to simultaneously measure temperature and lateral pressure.

Typically fiber Bragg gratings are generated by exposing the UV-photosensitive core of a germanium doped silica core optical fiber to a spatially modulated UV laser beam in order to create permanent refractive index changes in the fiber core. Such a spatially modulated UV beam can be created by using a two-beam interference technique as disclosed in U.S. Pat. No. 4,807,950 by Glenn et al. or by using a phase mask as disclosed in U.S. Pat. No. 5,367,588 by Hill et al.

A limitation of the prior-art UV-induced fiber Bragg gratings, especially for high temperature sensor applications is that operation of the sensor at elevated temperatures results in the erasure or annealing of the UV-induced color centers which are responsible for the induced index change of the grating. In fact, at temperatures approaching the glass transition temperature of the fiber, which for silica is approximately 1200° C., total erasure of the induced index modulation results. The optical fiber also is modified at such high temperatures making it brittle with diffusion of the core material into the cladding. The fiber can easily be deformed by its own weight.

The prior art FBG sensors suffer from serious limitations when measurement of displacement, temperature, strain and pressure are required at high temperatures. The materials used to fabricate the FBG sensing element deform or melt. The softening or glass transition temperature of silica optical fibers is typically 1200° C. At temperatures equal to or above this, silica optical fibers are not useful, even if they are coated with materials that melt at higher temperatures.

One approach to fiber-based measurements at high temperatures is to use sensor elements fabricated in fibers made of sapphire. Because sapphire has a very high glass transition temperature (~2030° C.), a sensor fabricated in this fiber can be operated in high temperature environments. Currently, sapphire fiber waveguides are only made in the form of rods with diameters as low as 50 µm. These rods lack a cladding or a coating material similar to conventional optical fibers. The large diameter of the sapphire fiber does not support single mode propagation at typical wavelengths used for FBG sensors in silica fiber thus does not allow the implementation of the FBG sensor as described previously. Murphy et al. in U.S. Pat. No. 5,381,229 have taught a technique for the fabrication of a sapphire optical fiber interferometric sensor based on the fabrication of a Fabry-Perot etalon on the tip of the sapphire fiber. Although this device is effective as a point sensor, is relies on the monitoring of the broadband interference fringe pattern generated by the Fabry-Perot etalon and therefore is extremely difficult to address in a wavelength-division or time-division multiplexing fashion. This makes the Fabry-Perot based fiber sensor inappropriate for distributed sensor arrays.

In another approach, Dils discloses in U.S. Pat. No. 4,750,139 a blackbody radiation sensing optical fiber thermometer system that employs a sapphire rod terminated in a black body tip composed of iridium sputtered onto the end of the rod. As with the Fabry-Perot based fiber sensor approach of Murphy et al., the sensor by Dils is effective only as a point sensor.

Mihailov et al. in U.S. Pat. Nos. 6,993,221 and 7,031,571, incorporated herein by reference, disclose techniques for fabrication of Bragg grating structures in optical media such as optical fibers and waveguides with an ultrafast (<500 ps) laser source and a phase mask using a direct writing technique. The resultant grating structures have high induced-index modulations (>1×10$^{-3}$). Since the refractive index change need not be dependent on the dopant in the core or cladding of the optical fiber or waveguide, refractive index changes can be induced in both regions of the waveguide. Mihailov et al. in U.S. Pat. No. 7,379,643 incorporated herein by reference, disclose how this technique of Bragg grating inscription using ultrafast laser pulses can be used to inscribe a Bragg grating sensor in optical waveguides such as sapphire that have much higher melting temperatures than silica. Mihailov et al. also teach in U.S. Pat. No. 7,379,643 how optical fiber tapers can be used to excite low order or fundamental modes of the multimode sapphire waveguides in order to improve the spectral response from the sapphire fiber Bragg grating for sensing applications facilitating the use of these gratings in distributed sensor arrays.

Recently Busch et al. disclosed in their paper, "Inscription and characterization of Bragg gratings in single-crystal sapphire optical fibres for high-temperature sensor applications," in the journal Measurement Science and Technology, vol. 20, no. 11, pp. 115301, 2009, incorporated herein by reference, that at high temperatures of 1745° C., the blackbody radiation produces a strong background spectrum with the sapphire optical fiber, which reduces the signal to noise ratio making the detection of a multimode Bragg resonance more difficult.

Recently Grobnic et al. disclosed in their paper entitled: "Multiparameter sensor based on single high-order fiber Bragg grating made with IR-femtosecond radiation in single mode fibers," in the journal IEEE Sensors, vol. 8, no. 7, pp. 1223-1228 (2008), incorporated herein by reference that high order Bragg gratings written in single mode optical fiber produce Bragg reflections or resonances that differ in wavelength but also respond differently to parameters such as strain and temperature. The Bragg resonance is defined by $$m\lambda_{Br}=2n_{eff}\Lambda \quad (1)$$

where $n_{eff}$ is the effective refractive index seen by the resonating guided core mode, $\Lambda$ is the period of the grating within the waveguide and in is the diffracted order number of the Bragg resonance $\lambda_{Br}$. As the wavelength resonances generated by the individual diffracted orders vary differently when subjected to environmental parameters such as temperature and strain, a single grating element that produces these multiple resonances can be used to decouple simultaneously strain and temperature effects from the shift in Bragg wavelength. The results presented are limited only to single mode fibers.

It is an object of this invention to overcome the aforementioned limitations within the prior art systems for fabrication of a high temperature FBG sensor that can simultaneously measure more than one effect such as temperature and strain.

It is a further object of this invention to provide a method for either increasing either the coupling of black body thermal radiation into a sapphire optical fiber by inscription of a sapphire FBG or having that grating element act as an emissivity element within the fiber. Advantageously, by promotion of the black body radiation level, a sensor system can be made that does not require an optical source to probe the grating sensor as in traditional FBG sensor arrays. By having improved signal to noise ratios through the excitation of fundamental or low order modes of the multimode sapphire fiber as taught by Mihailov et al. in U.S. Pat. No. 7,379,643 a dual stress/temperature sensor is realized. By monitoring the signal level of thermal blackbody radiation as a temperature reference, the portion of the wavelength shift of the Bragg grating in the sapphire fiber that is dependent on temperature can be decoupled from the strain. This device would be useful for monitoring strains in high temperature environments.

SUMMARY OF THE INVENTION

In accordance with an aspect of the invention there is provided, a method of determining a value of a parameter comprising:

a) providing a high temperature sensor capable of withstanding a temperature of at least 650° C., wherein the sensor has a wavelength dependent element therein;

b) placing the high temperature sensor at a location where a black body radiation is generated about the wavelength dependent element wherein the black body temperature does not exceed the glass transition temp for the wavelength dependent element;

detecting a composite signal at a location away from the sensor; and, decoupling the composite signal to obtain a temperature value and to determine the value of the parameter.

In the step above, wherein the temperature sensor is placed at a location where a black body radiation is generated "about" the wavelength dependent element, includes heating a region within the wavelength dependent element or a region near or in the vicinity of the wavelength dependent element such that black body radiation is transmitted or reflected from the wavelength dependent element to the detector. Thus the term about is to be construed as within or near the wavelength dependent element.

In accordance with another aspect of the invention a system for determining a value of a parameter is provided comprising:

a) a high temperature sensor capable of withstanding a temperature of at least 650 deg C., wherein the sensor has a wavelength dependent element therein;

b) a single detector optically coupled to the sensor via an optical waveguide, for detecting composite signal including black body radiation and a wavelength dependent signal from the sensor when the sensor or a region about the sensor is heated at black body temperature; and c) a computer program for executing on a computer for decoupling the detected black body radiation and the detected signal from the sensor element to determine the value of the parameter.

An optical waveguide sensor is provided that may conveniently be made of a crystalline material such as sapphire, which has written into the core thereof, a retro-reflective grating that is suitable as a sensor in high temperature environments. When the rod consists entirely of a core material having no cladding, which is typically the case with a sapphire optical fiber, the grating can be used as a chemical sensor for sensing information about the surrounding environment. The probe electromagnetic radiation signal guided within the waveguide easily couples evanescently into the environment surrounding the waveguide. Variations in the refractive index of the environment result in a shift of the Bragg resonance of the grating. The crystalline material having the grating written therein can also be used to measure mechanical strain and temperature simultaneously. By monitoring the signal level of the thermal blackbody radiation, a value for the device temperature of the grating can be determined. This information can be used to account for the portion of the shift in $\lambda_{Br}$ due to temperature. Remaining variations in $\lambda_{Br}$ can then be used to measure another parameter such as strain, pressure or refractive index.

In accordance with another aspect of this invention, if the Bragg grating is written such that it produces higher order resonances, m>1, the multiple Bragg resonances can also be used to decouple multiple parameters such as temperature, strain or refractive index of the material surrounding the waveguide, from the shifts of higher order resonances produced by the Bragg grating.

In accordance with another aspect of this invention, the thermal blackbody radiation can be used as an optical source to probe the Bragg resonance thus simplifying the sensing apparatus typically associated with FBG sensor arrays allowing for the grating devices to be probed in both transmission and reflection without requiring a laser or broadband optical source.

In accordance with another aspect of this invention, the presence of the grating itself acts to enhance the coupling of thermal blackbody radiation into the optical fiber either through a resonance of the grating structure with the blackbody radiation wavelengths or through enhanced emissivity of thermal radiation of the resultant grating structure.

In accordance with a broad aspect of the invention a high temperature optical fiber such as a sapphire crystal fiber is provided comprising a Bragg grating written into the core region thereof for use in a sensing system. Preferably the Bragg grating is written into the core region thereof by using short femtosecond pulses.

Since sapphire optical fiber in accordance with an embodiment of this invention has no cladding; that is, is essentially a core structure clad only by surrounding air, the term writing into the core region means writing into the core material of the waveguide, or preferably across its entire cross section.

In accordance with the invention, a sensing system is provided having a sapphire crystal fiber having a Bragg grating written into the core by using short femtosecond pulses.

This technique for writing Bragg gratings in the core of a sapphire fiber can be used to write similar structures into zirconia fiber, diamond, silicon nitride and other materials having a high glass transition temperature, therefore this invention is not limited to sensing within a sapphire optical fiber but other suitable materials having a high enough glass transition temperature and which may be inscribed with a grating may be used.

BRIEF DESCRIPTION OF THE DRAWINGS

Exemplary embodiments will now be described with reference to the drawing in which.

DETAILED DESCRIPTION OF THE INVENTION

Fiber Bragg gratings were made in 120 µm diameter sapphire fibers using femtosecond 800 nm (fs-IR) pulses from an ultrafast Ti:sapphire regenerative amplifier and a 1.747 µm period phase mask resulting in a second order Bragg resonance $\lambda_{Br}$ in the sapphire fiber at 1524 nm at room temperature.

The fs-IR 6.4 mm beam was focused with a 25 mm focal length cylindrical lens through the phase mask and onto the sapphire fiber. Since the sapphire fibers have a hexagonal cross-section, they were placed in a rotation jig that would allow the fiber to be turned along its axis in order to optimize the exposure. The fs-IR beam was focused inside the fiber and then scanned normal to the fiber axis using a precision vertical stage in order to expose the whole cross section of the sapphire fiber to the laser beam. The resultant SFBG was ~6 mm long.

Figure 1:
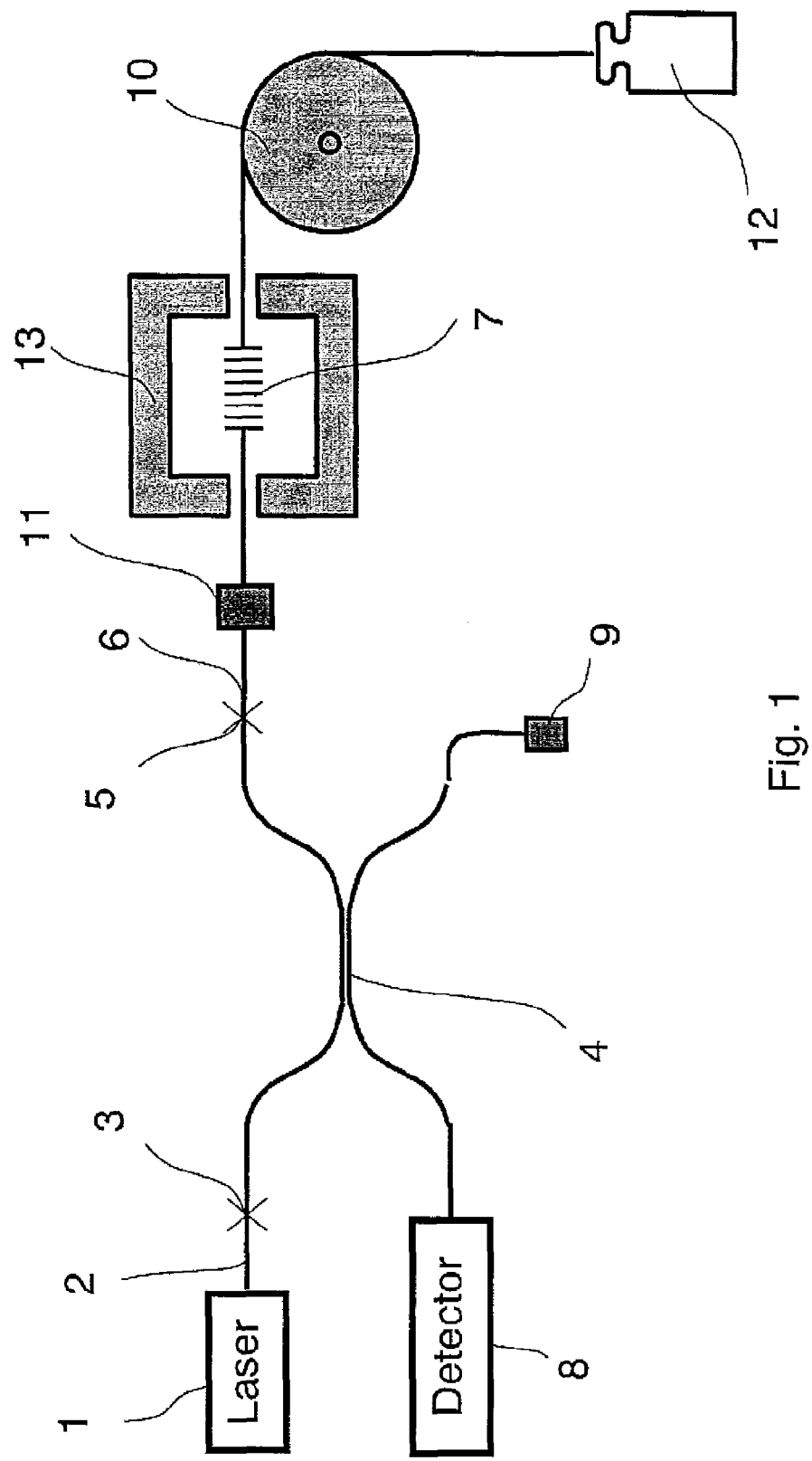
FIG. 1 is a schematic diagram of the monitoring set up of the multimode sapphire fiber Bragg grating sensor according to a preferred embodiment of the invention.

As the sapphire fiber is essentially a sapphire rod absent a cladding layer, the spectral response from an inscribed grating is highly multimode. Referring to FIG. 1, light generated by a laser diode or tunable laser 1 is coupled into single mode fiber 2. Light coupled into fiber 2 couples into the input arm of the 50-50 multimode coupler 4 through the single to multimode fiber splice 3. The coupler is preferably manufactured with 105/125 µm core/clad silica fiber in order to be better matched with the sapphire fiber. The coupler 4 splits the signal in two with each signal at 50% of the energy. One portion of the beam propagates along the fiber that is terminated with index matching gel 9 and is lost. The other portion propagates to the multimode fibre-sapphire fibre splice 5 and then into an optical waveguide in the form of sapphire fibre 6. The light then interacts with a wavelength dependent element in the form of a Bragg grating 7 and a portion of the light is resonantly coupled into back reflecting modes by the grating 7. The back reflected modes return along the incident path of 6, 5, and 4 to be split again with each reflected signal 50% of the original reflected signal, one portion returning to the laser source 1, the other to the detector 8. In the preferred embodiment the detector is an optical spectrum analyzer.

In order to measure variations of $\lambda_{Br}$ with applied strain, the sapphire fiber 6 was laid across a 50 mm diameter mandrel 10 with one end of the sapphire fiber clamped 11 near the SFBG. Various weights 12 were suspended from the other free end of the fiber. The SFBG was then placed within the heated region of a high-temperature ceramic micro-furnace 13. A He—Ne laser was coupled into the sapphire fiber in order to position the grating within the furnace by observing the out-scattered light from the grating. Temperature was monitored at the micro-furnace center by the shift in the Bragg resonance as well as by a platinum-rhodium thermocouple with a measurement range up to 1700° C. A gradient with a 20% decrease in the temperature from the center to edge of the 20-mm-long micro-furnace was observed. The furnace was then allowed to stabilize for one hour at a given temperature before strain was applied to the grating.

Figure 2:
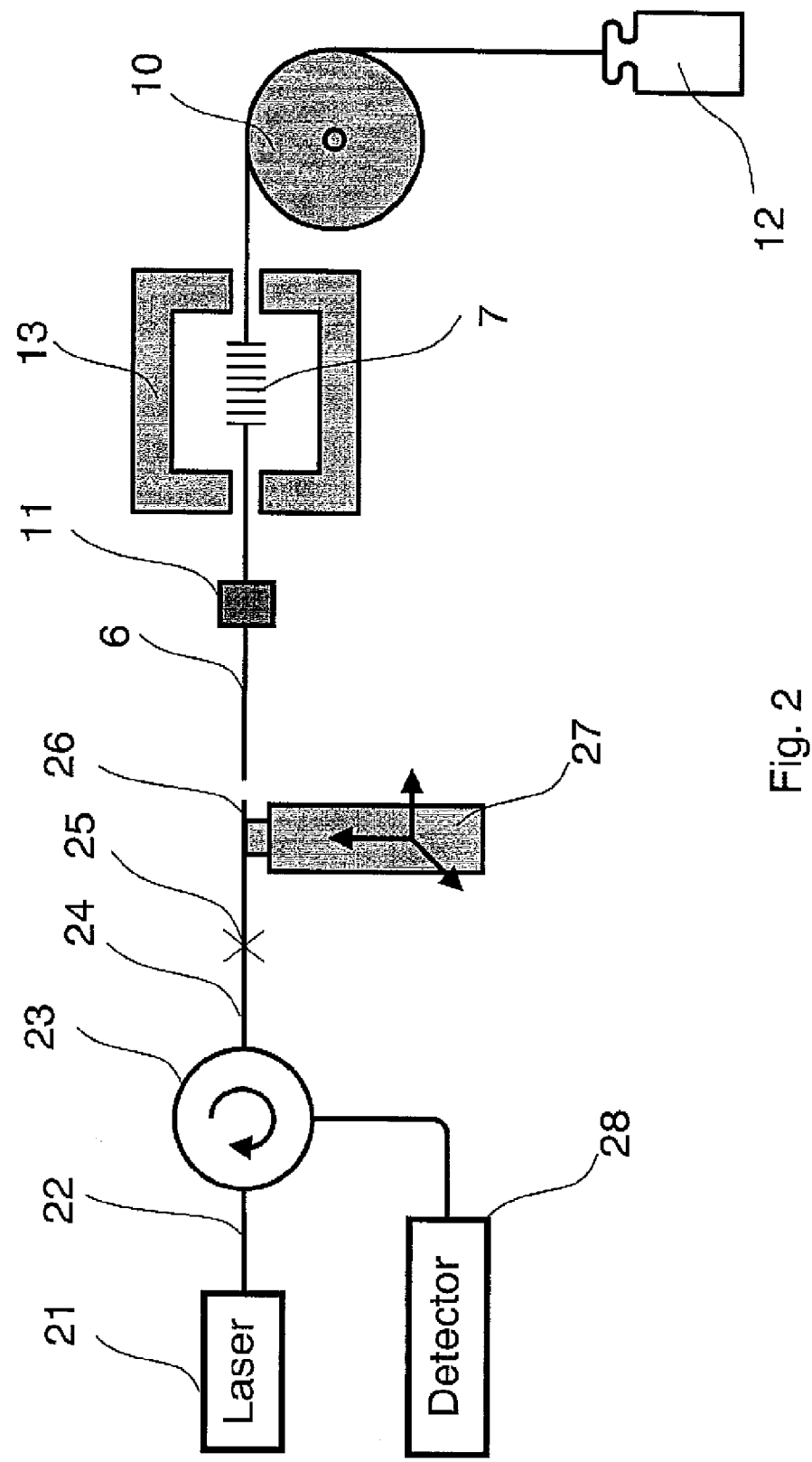
FIG. 2 is a schematic diagram of the monitoring set up of the multimode sapphire fiber Bragg grating which was interrogated using a single mode fiber mode expander.

In order to obtain a single mode response from the sapphire grating, the SFBG can be probed using a commercially available 60 μm mode-field diameter fiber collimator, an adiabatically tapered single mode fiber or a mode field expander as taught by Bilodeau et al. U.S. Pat. No. 7,606,452. Referring to FIG. 2, the single mode interrogation of the sapphire fiber grating is as follows: Light from a tunable laser 21 in the form of an optical probe signal is launched into a single mode fiber 22 that passes through an optical circulator 23. The single mode fiber output from the optical circulator 24 is spliced 25 into the single mode fiber mode expander 26, which is either a tapered optical fiber, a single mode beam expander such as a grin lens or the mode field expander described in U.S. Pat. No. 7,606,452. The expanded single mode is then launched into the sapphire fiber 6 using a 5-axis precision translation stage 27 and propagates along the fiber until it reaches the Bragg grating structure 7. If the incident wavelength of the mode is at the Bragg resonance, then the interaction of the incident mode with the Bragg grating produces back reflecting modes which are then re-coupled into the single mode fiber mode expander 26 and become a single mode response when they leave the single mode fiber mode expander 26 back into the standard fiber 24. This reflected signal then passes through the circulator 23 onto the photo-detector 28. The detector 28 is preferably an optical spectrum analyzer.

Figure 3:
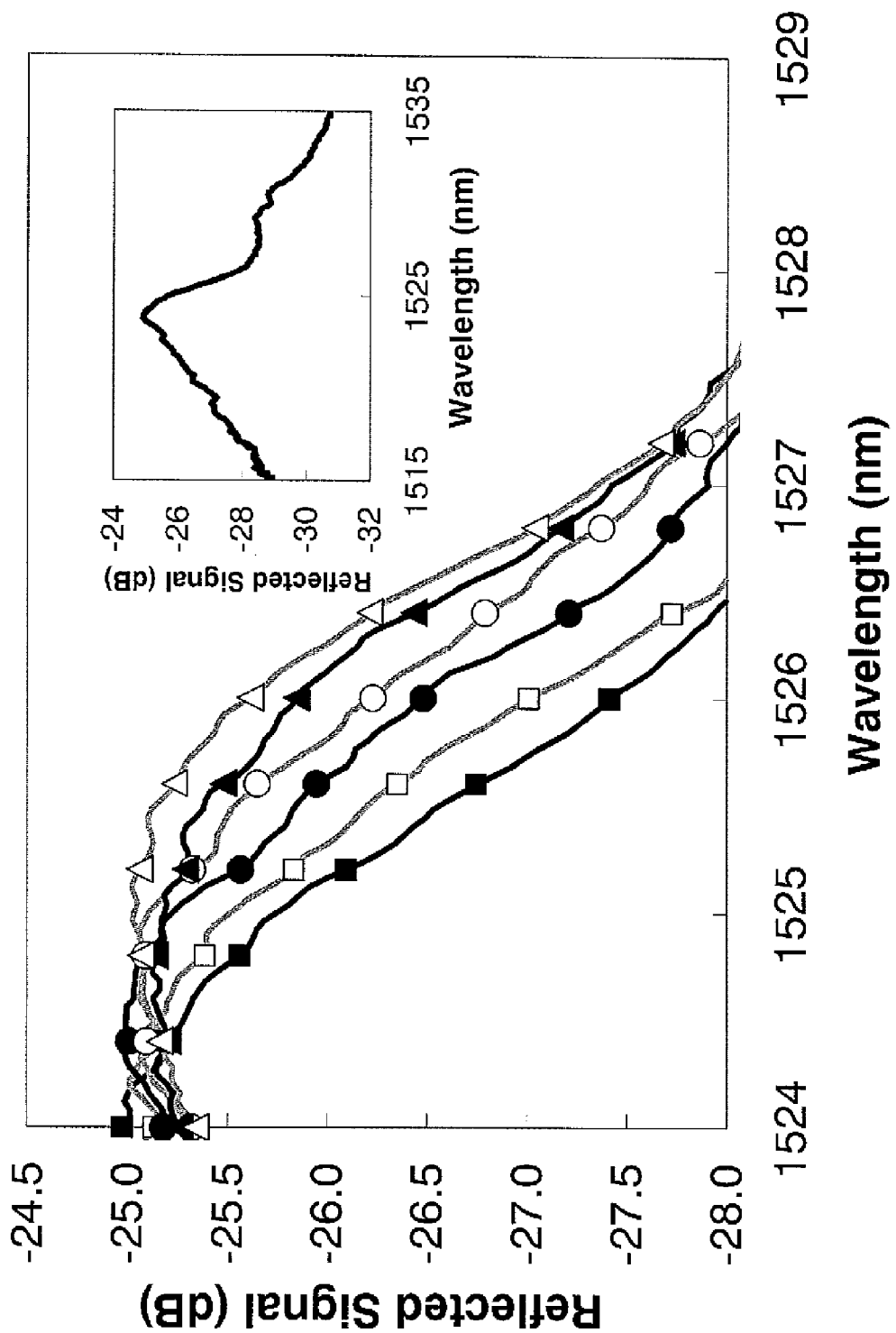
FIG. 3 is the variation in the multimode reflection spectrum of the SFBG as a function of applied weight at room temperature (black square no strain, white square 100 g, black circle 200 g, white circle 280 g, black triangle 380 g, white triangle 450 g). Inset figure is the full reflection spectrum without strain.
Figure 4:
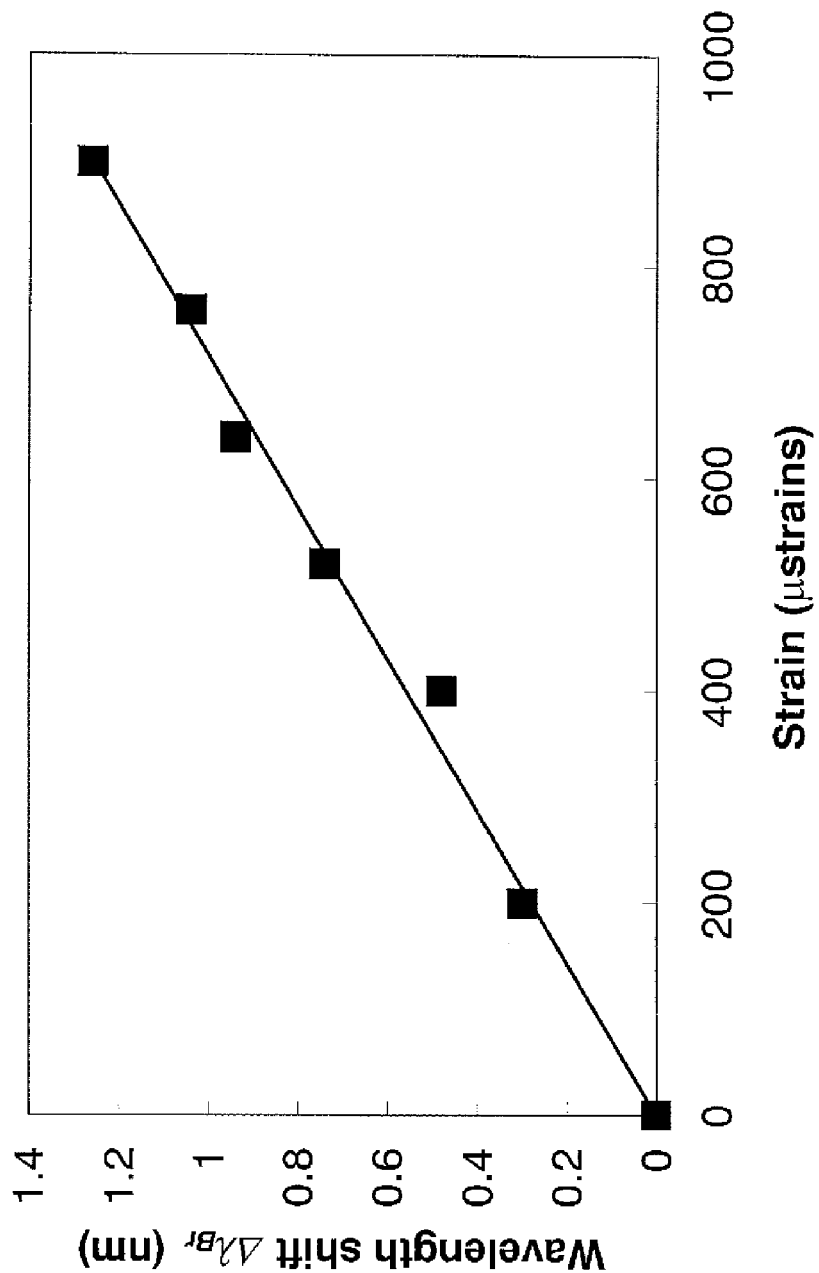
FIG. 4 is the wavelength shift as a function of strain (from FIG. 3 data) as measured using the multimode coupler set up of FIG. 1.

From Dils, the Young's modulus for sapphire is 400 GPa. The strain associated with the suspension of a 100-gram weight from a 120 μm diameter fiber is then 217 μstrains. FIG. 3 presents variations in the multimode reflection spectrum (inset) with applied strain at room temperature using the apparatus shown in FIG. 1. The overall reflectivity of the grating was approximately 3%. By noting the wavelength shift of the falling edge of the long wavelength side of the multimode Bragg resonance, the wavelength shift as a function of strain is presented in FIG. 4. Based on the linear regression curve of the figure, the wavelength shift is 1.4 pm/μstrain. The sapphire FBG has a slightly higher sensitivity to strain than a similar device inscribed in standard telecommunication fiber, which has a wavelength shift at 1550 nm of 1.2 pm/μstrain as noted by Kersey et al. in J. Lightwave Technol., vol. 15, no. 8, pp. 1442-1463, 1997, incorporated herein by reference.

Figure 5:
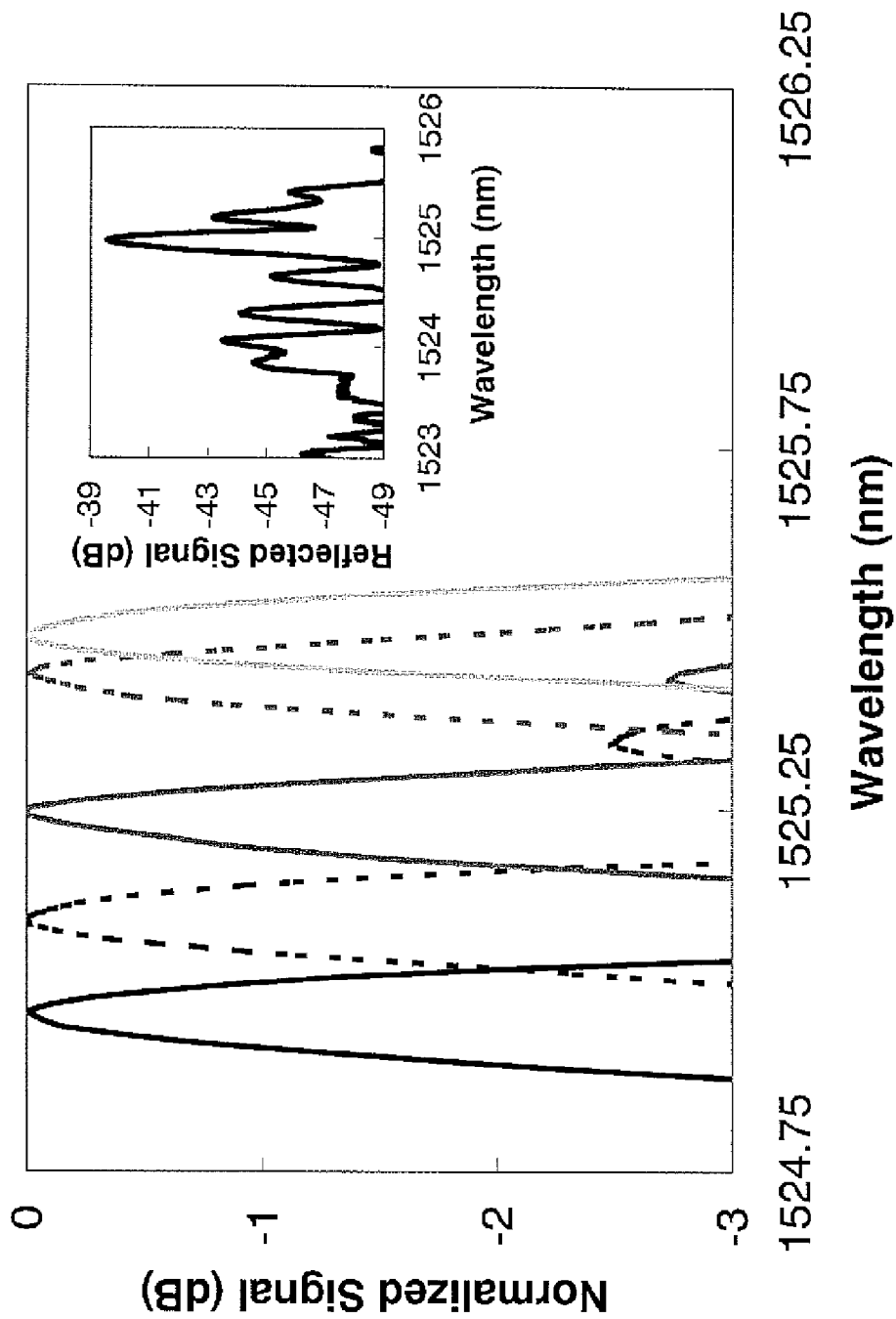
FIG. 5 denotes the variation in the single mode reflection spectrum of the SFBG as a function of applied weight at room temperature. Solid black, doted black, solid dark gray, doted dark gray and light gray traces correspond to applied masses of 0 g, 50 g, 100 g, 170 g, and 200 g respectively.

Using the set up described in FIG. 2 a single mode response was obtained from the sapphire fiber after it was probed using a fiber collimator producing a 60 μm diameter mode field that was connected to the optical circulator. The variation in the single mode reflection spectrum (inset FIG. 5) with applied strain at room temperature is shown in FIG. 5. The use of the single mode response allows for a higher resolution in the strain measurement.

Figure 6:
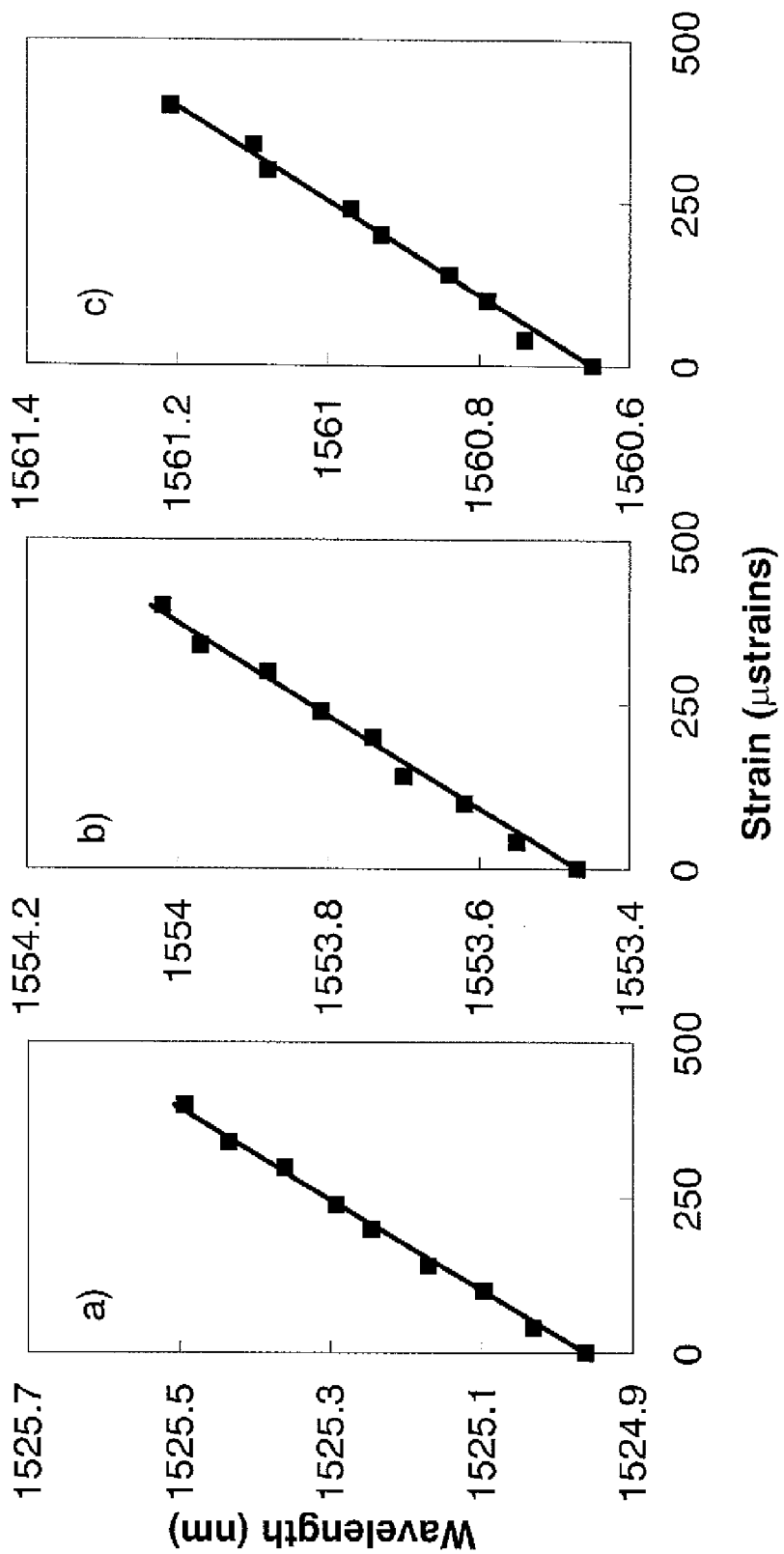
FIG. 6 presents the wavelength variation of the SFBG as a function of applied strain at a) 22° C., b) 1078° C. and c) 1288° C.

To evaluate strain measurements at elevated temperatures, the microfurnace was then placed about the grating and the temperature was increased while no strain was applied to the fiber. The wavelength shift as a function of strain at different temperatures is given in FIG. 6. Linear regressions of the wavelength variation versus strain at room temperature, 1078° C. and 1288° C., are almost identical with the wavelength shift again being 1.4 pm/μstrain.

Figure 7:
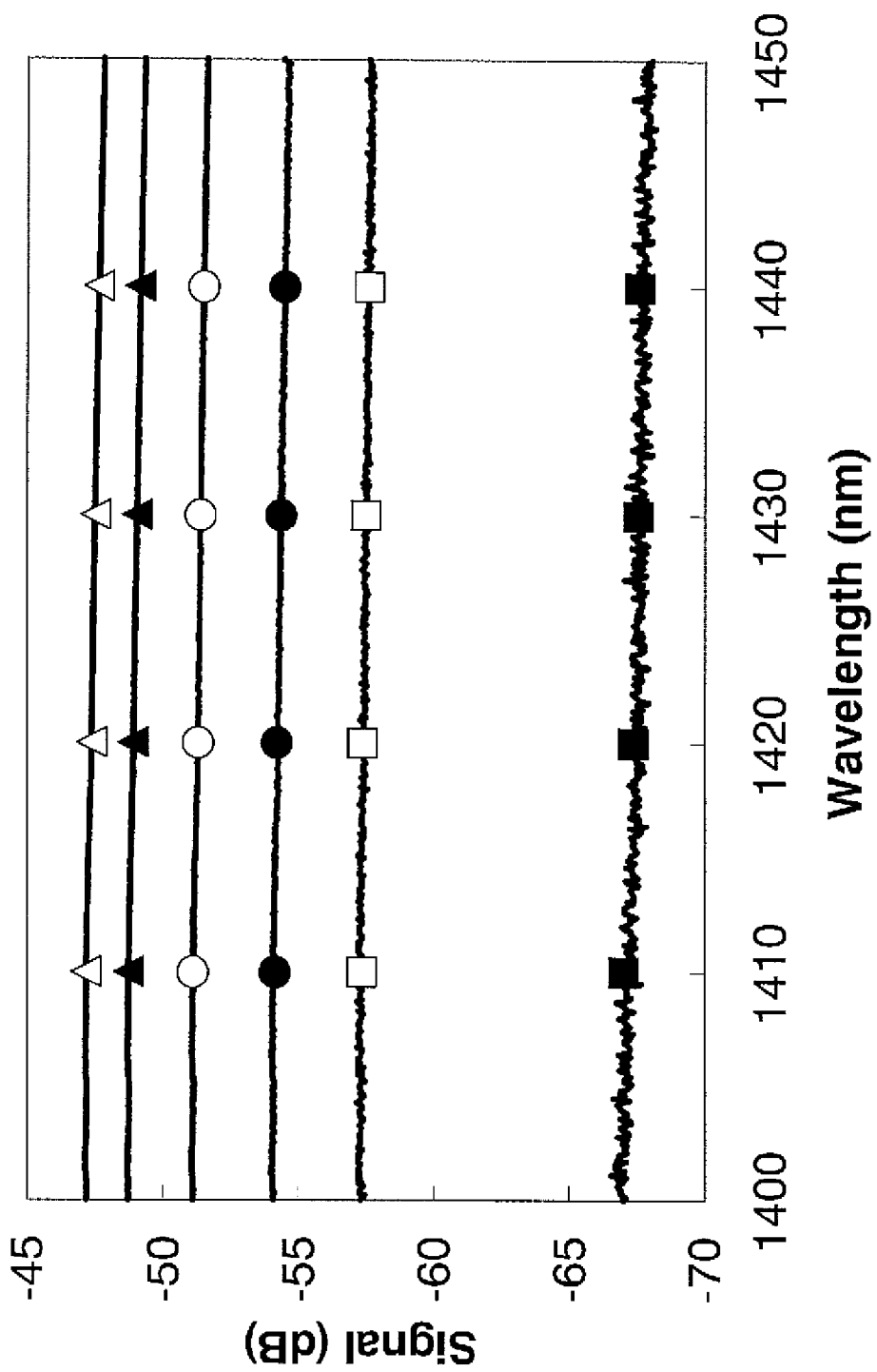
FIG. 7 presents the increase in thermal blackbody radiation signal background as a function of temperature (black square: 640° C., white square: 850° C., black circle: 965° C., white circle: 1080° C., black triangle: 1220° C., white triangle: 1290° C.).
Figure 8:
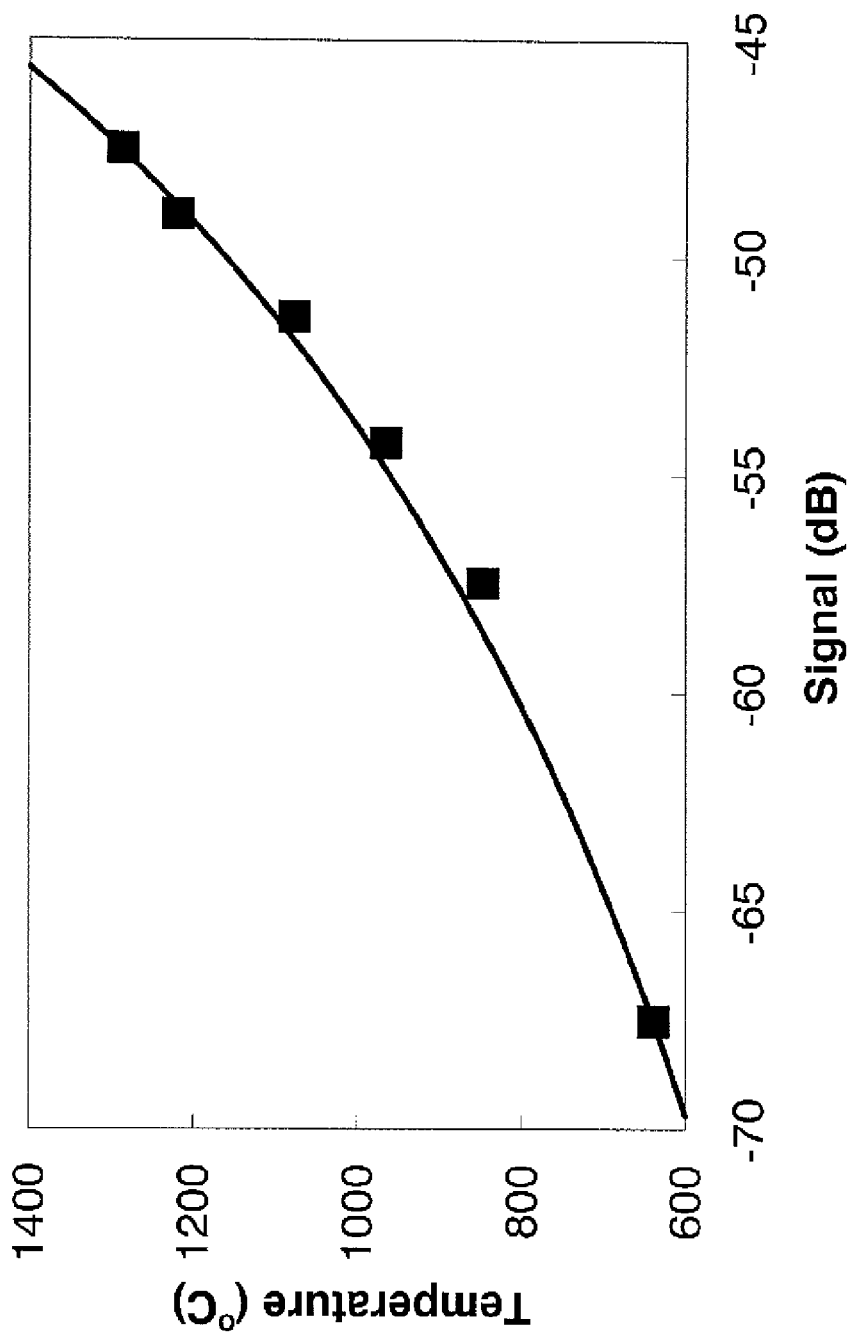
FIG. 8 presents the variation in background signal level shown in FIG. 7 (black squares) as compared to Plank's equation of thermal blackbody radiation emittance (solid line).

With increasing temperature, an increase in the background signal level due to blackbody radiation was observed. Using the optical spectrum analyzer, low-resolution signal levels were measured in the 1400-1450 nm range and are shown in FIG. 7. The corresponding temperatures in the figure were measured via the thermocouple and the unstrained SFBG $\lambda_{Br}$. These signal levels were compared with the expected theoretical blackbody radiation levels. From Planck's radiation equation, the spectral emittance into a solid angle $2\pi$ by unit area of blackbody as a function of wavelength is given by:

$$u_2 = \frac{2\pi hc^2}{\lambda^5(\exp(hc/\lambda kT) - 1)} \quad (2)$$

where c is the speed of light and h and k are Planck's and Boltzmann's constants respectively. Normalizing the resultant emittance at 640° C. with the baseline signal detected in FIG. 7, the increase in signal level clearly follows Planck's eq. (2) (see FIG. 8).

In addition to the thermal black body radiation acting as temperature reference, it can also be used as an intrinsic optical source within the fiber removing the need for the optical sources depicted in FIG. 1 and FIG. 2. At high temperatures, it was observed that the amount of thermal blackbody radiation guided within the fiber was significantly larger in the presence of a grating than in the case of the sapphire fiber without a grating. The presence of the grating may enhance the coupling of external black body radiation into the fiber or increase the sapphire fiber emissivity. The enhanced black body radiation signal is of sufficient strength to convey the spectral signature of the grating to the detector at the end of the fiber.

Figure 9:
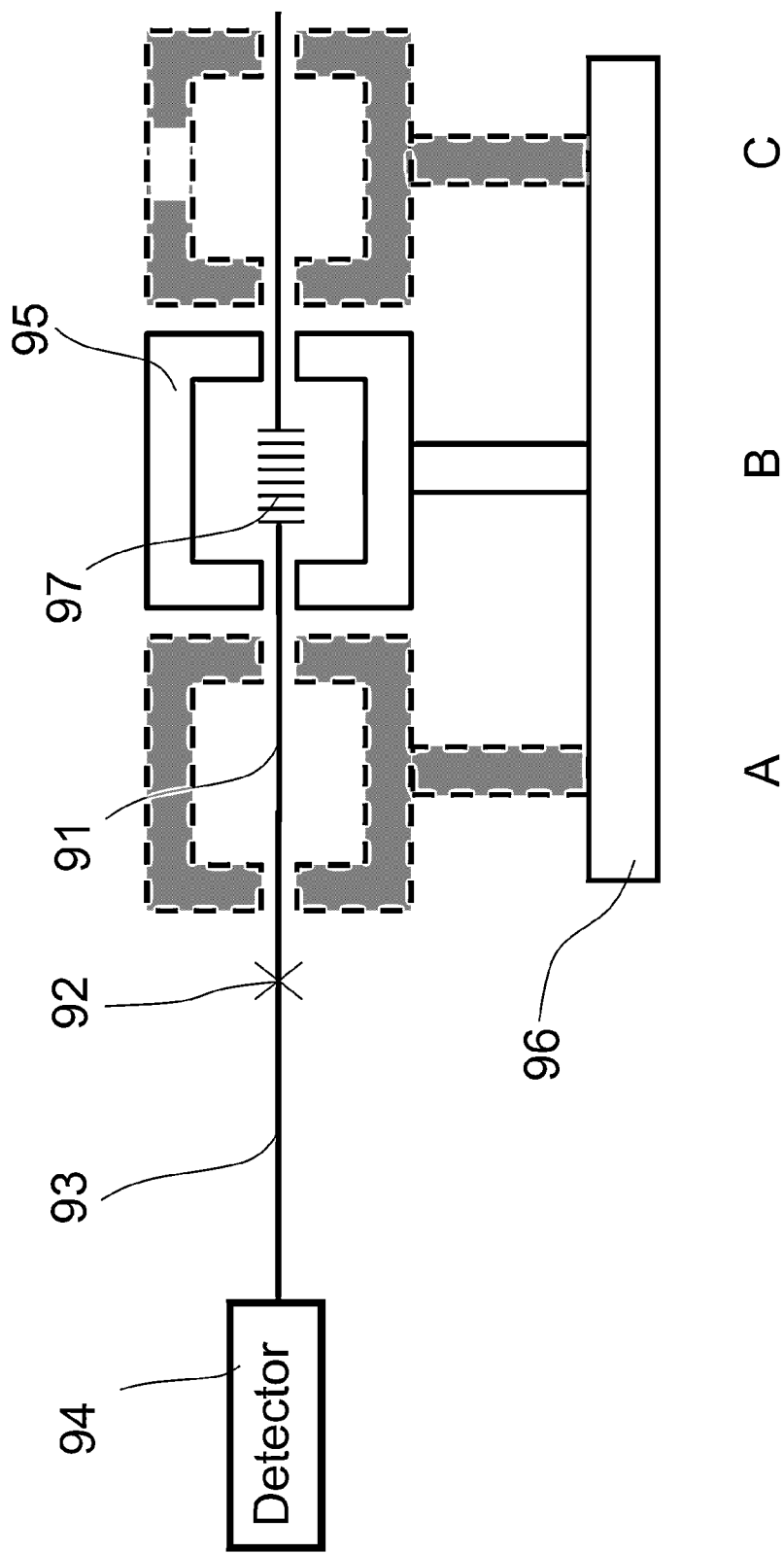
FIG. 9 presents a schematic of the set up used to detect the blackbody radiation signal power at 1400° C. as a function of the position of the center of the micro-furnace with respect to the center of the Bragg grating.

Referring to FIG. 9, in order to measure the radiation intensity coupled by the grating in the sapphire fiber, the SFBG 97 is mechanically spliced 92 to a 1 m long silica optical fiber with 105 μm core 93. The other end of the silica multimode fiber was connected to the optical spectrum analyzer 94. The micro-furnace 95 was placed on a long travel translation stage 96 and slid along the sapphire fiber 91 to positions A, B, and C in the figure, past the Bragg grating 97. The temperature of the micro-furnace 95 is increased from room temperature to 1400° C. and the power spectrum of the signal coupled to the sapphire fiber was measured with the spectrum analyzer and a detector/power meter. Locations A, B, and C were 29, 25 and 23 cm distant from the free end of the sapphire fiber.

Figure 10:
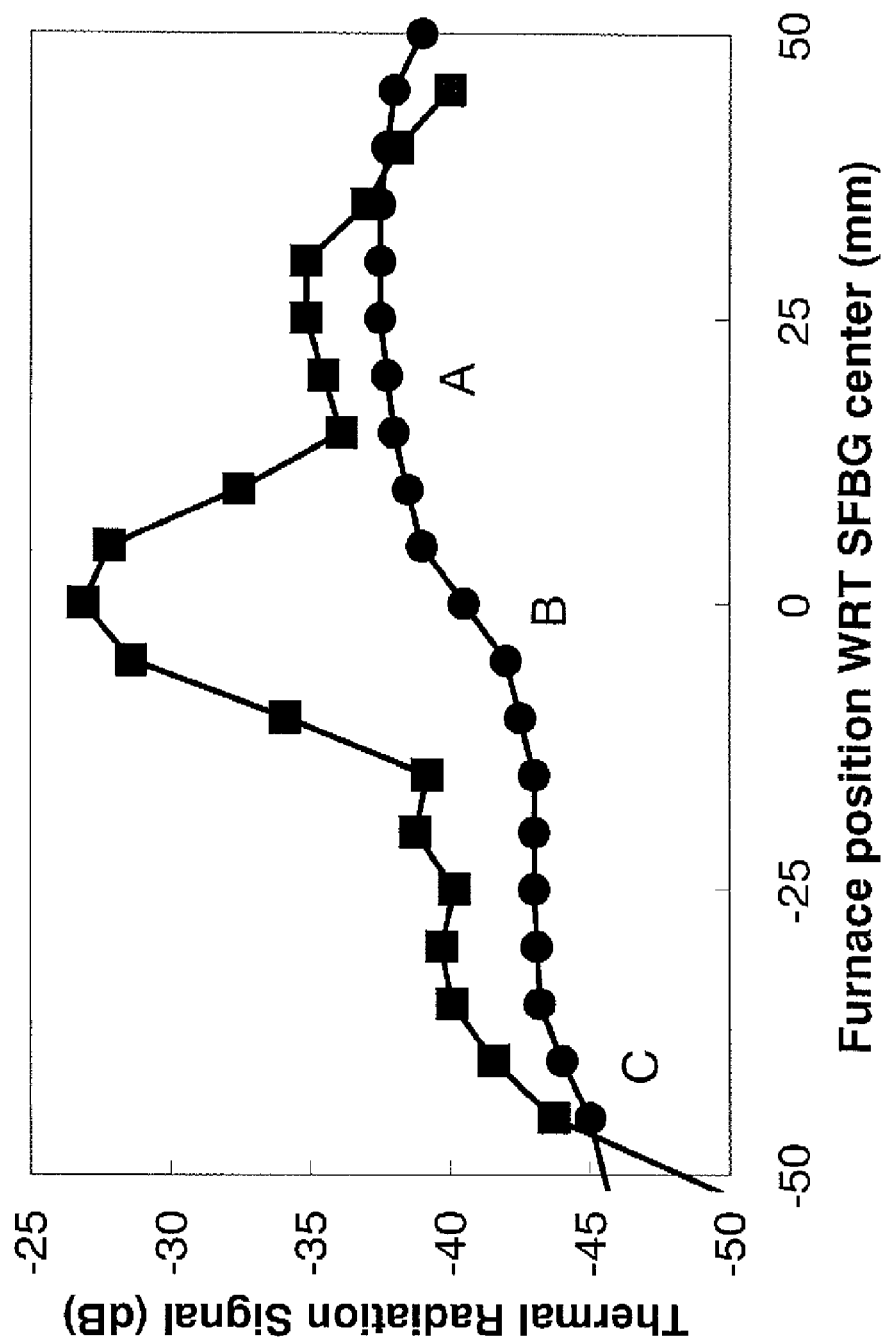
FIG. 10 presents the detected blackbody radiation signal power at 1400° C. as a function of the position of the center of the micro-furnace with respect to the center of the Bragg grating.

The relative position of the sapphire grating and the center of the furnace was evaluated using a He—Ne laser that was coupled to the sapphire fiber and noting the position of the out-scattered He—Ne light at the SFBG location. The intensity of the signal measured by the power meter when the micro-furnace is placed at different positions along the sapphire fiber is presented in the FIG. 10. Positions A, B, and C shown in FIG. 9 are also specified in FIG. 10. The maximum power was recorded when the sapphire Bragg grating was positioned at the center of the micro-furnace. The second trace in the FIG. 10 is a measurement of the radiation intensity on a strand of sapphire fiber without a Bragg grating placed in the same configuration as the previous fiber. It shows that the radiation intensity measured by the detector increases when the micro-furnace is moved closer to the coupling point between the sapphire fiber and the silica pigtail that is connected to the detector and it is due to the scattering loss of the sapphire fiber. According to the measurement the radiation signal increases with almost 9 dB due to the grating.

Figure 11:
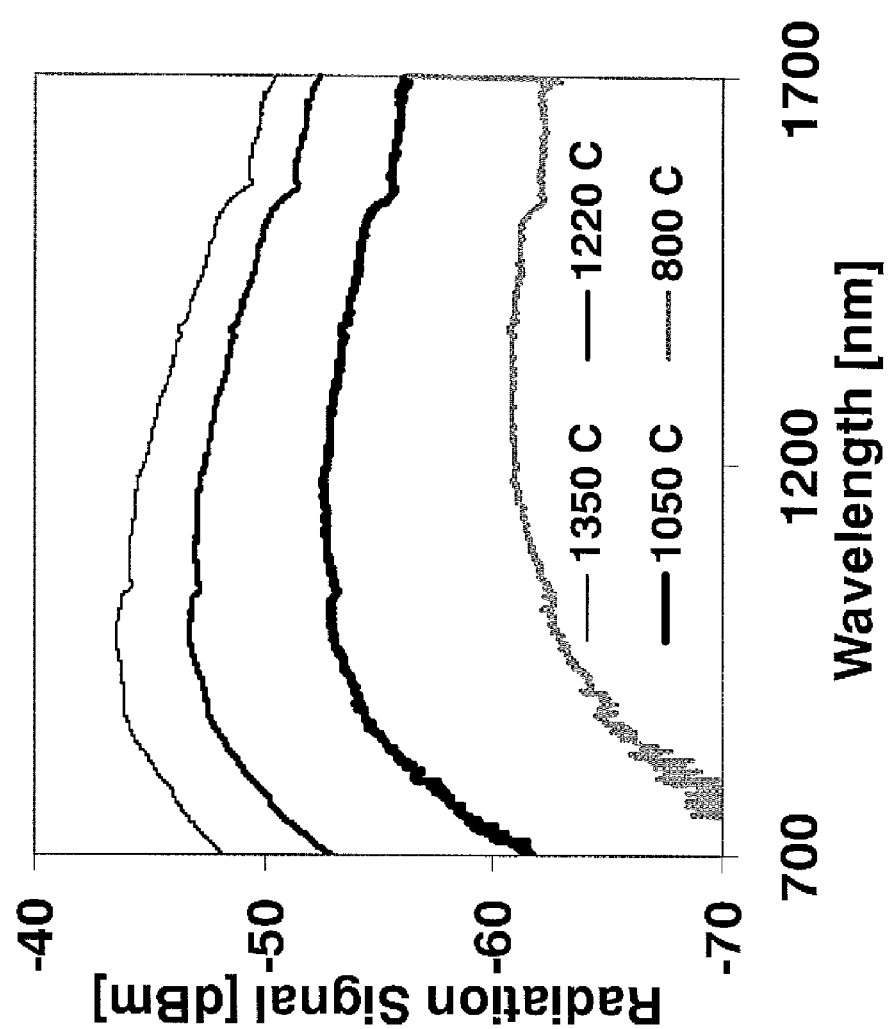
FIG. 11 is the spectra of the thermal radiation at different temperature with the Bragg grating was placed in the center of the micro-furnace.
Figure 12:
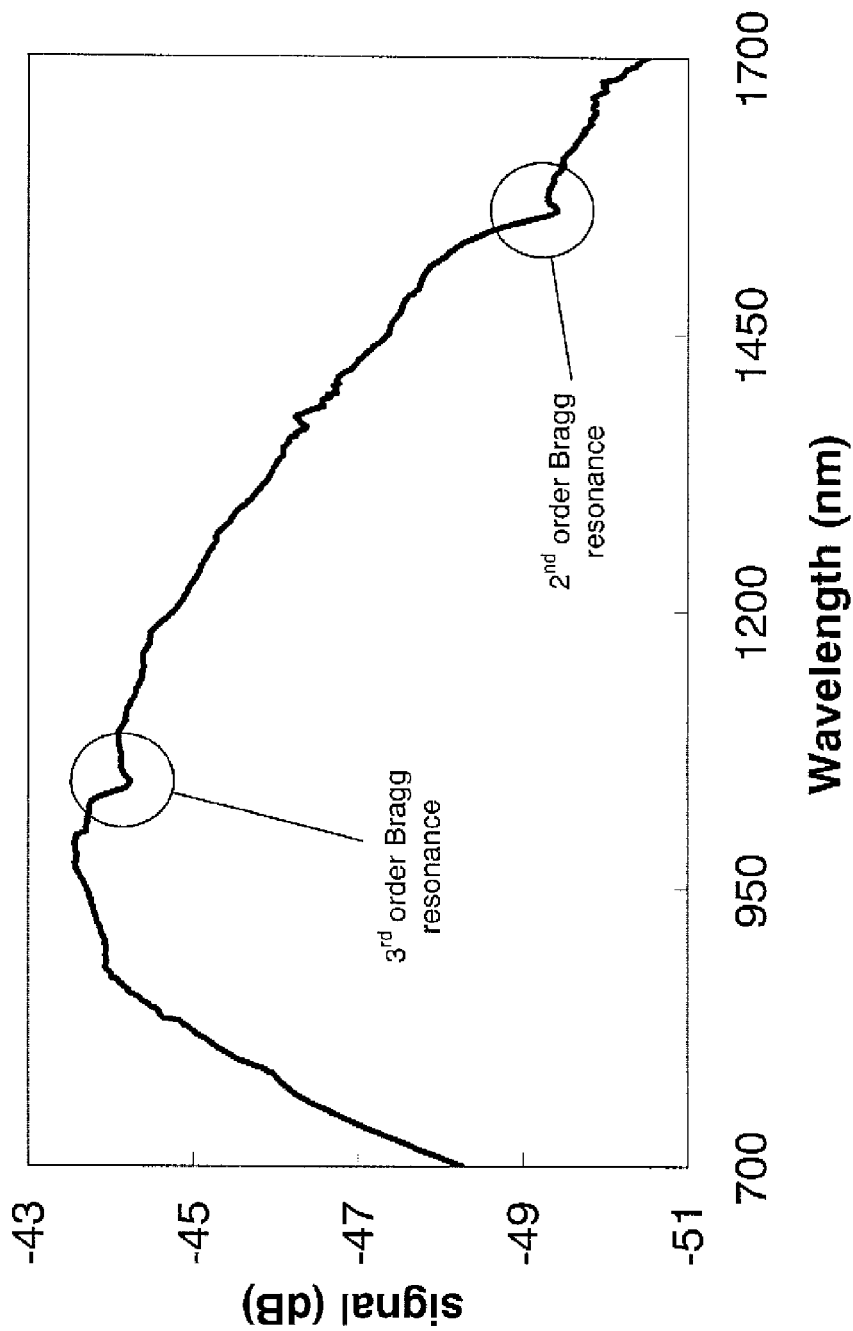
FIG. 12 is an expanded view of the thermal radiation spectrum at 1350° C., denoting the second and third order Bragg resonances.

When the microfurnace is placed about the grating at position B, the spectrum of the thermal blackbody radiation can be measured. In FIG. 11 the measurement of the thermal radiation made with the optical spectrum analyzer shows the second order Bragg grating resonance at 1523 nm as well as a second resonance observed at 1042 nm which corresponds to the third order Bragg resonance from the grating. FIG. 12 is an expanded view of the 1350° C. data indicating the grating resonances.

Figure 13:
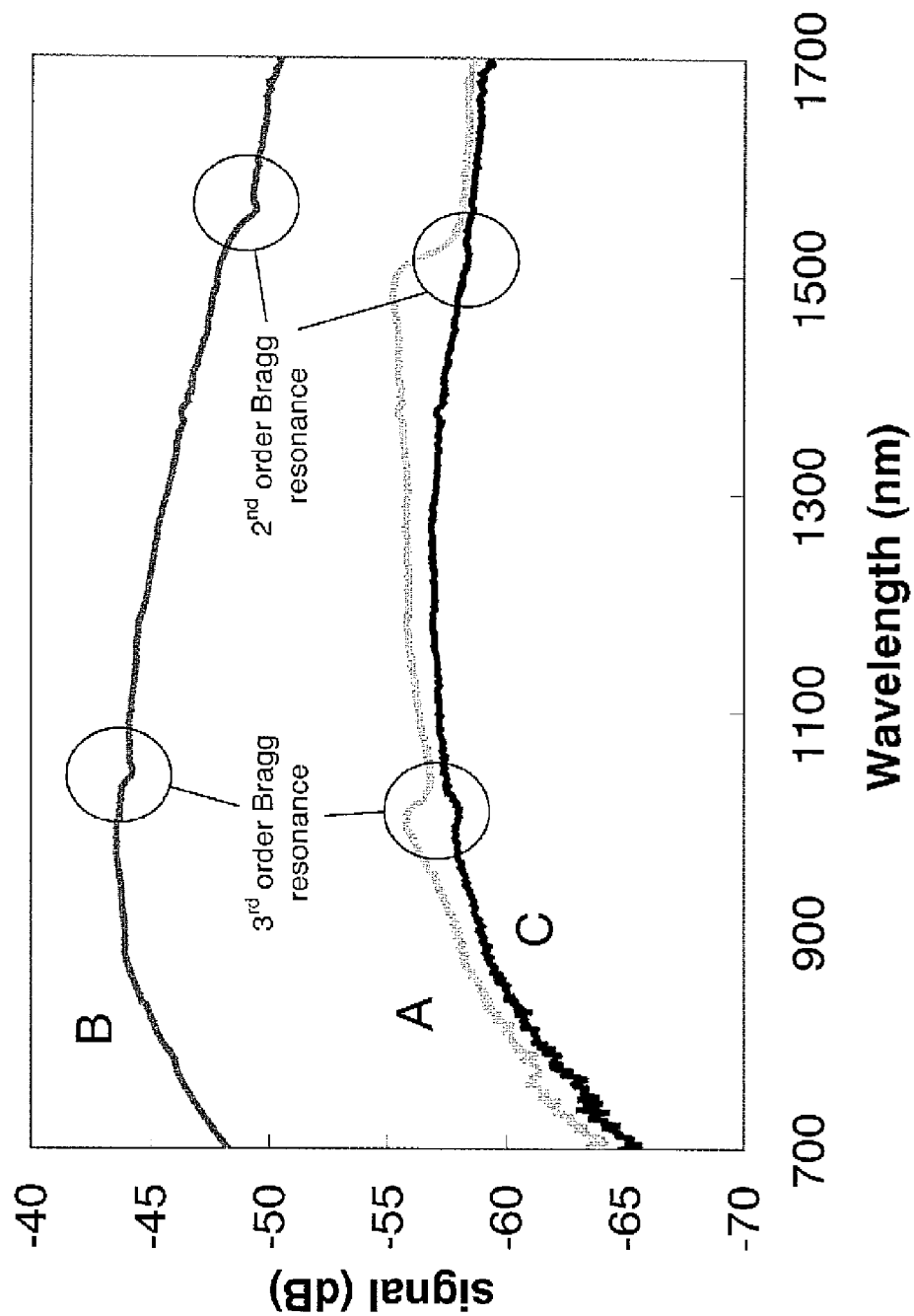
FIG. 13 show the thermal radiation spectra obtained from the sapphire fiber when the micro-furnace is positioned at locations A, B, and C denoted in FIG. 9.
Figure 14:
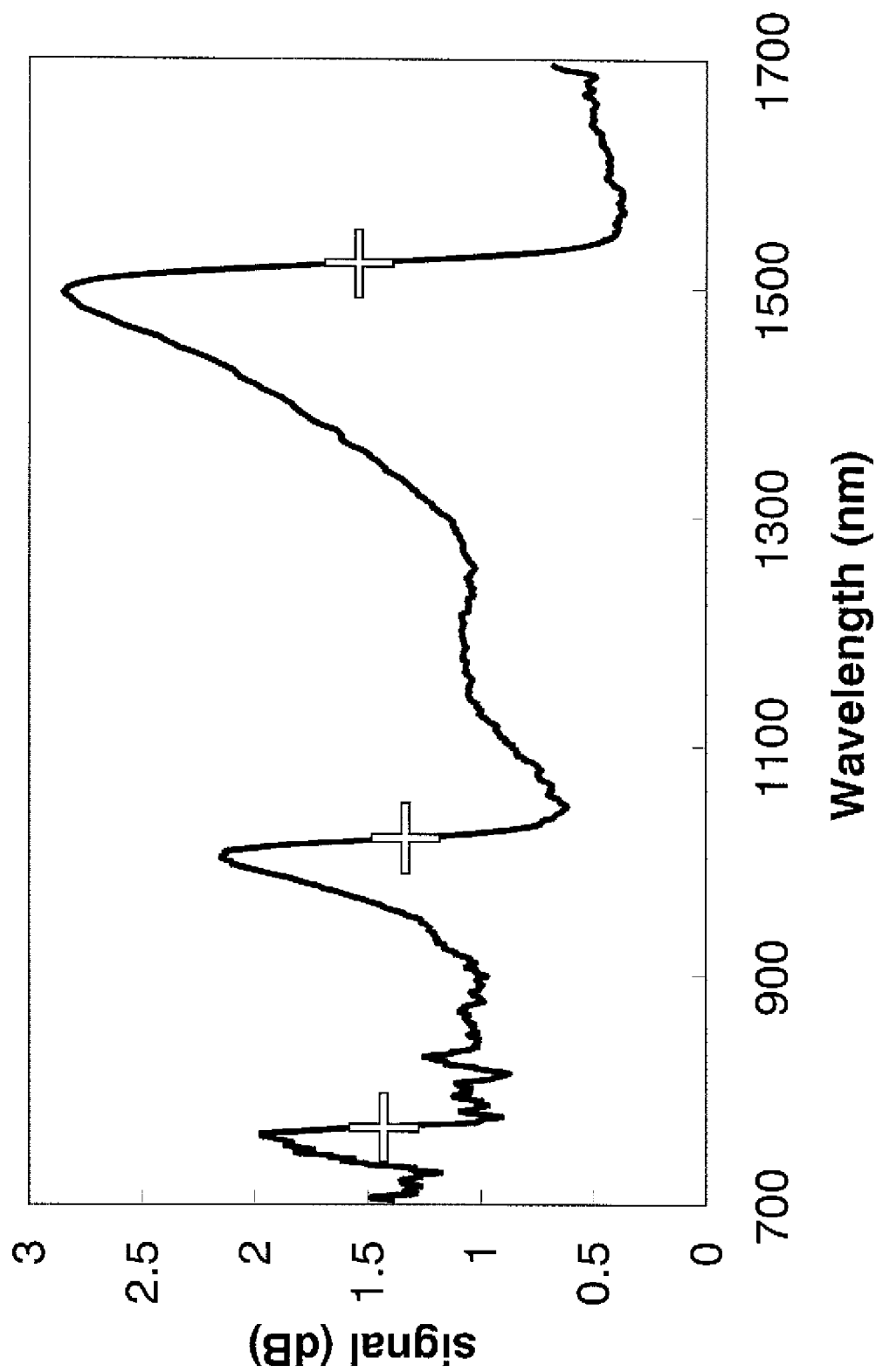
FIG. 14 shows the subtraction of spectral traces C from A in FIG. 13. The white crosses denote the location of the fundamental mode within the multimode spectrum of the Bragg resonances.

When the furnace is placed at location A, between the SFBG and the detector, the unusual response denoted by the A trace in FIG. 13 results. At the wavelengths consistent with the Bragg resonances at room temperature, increased broadband signal levels are observed. This increase is likely due to radiation that is generated at location A, guided to the grating location B and then reflected to the detector. FIG. 14 presents the results of subtracting trace C from A. From FIG. 14, the $2^{nd}$ and $3^{rd}$ order resonances are clearly observable at 1523 and 1022 nm respectively, where the wavelength is measured at the half maximum point of the long wavelength side of the peak, which is denoted by white crosses in the figure. Interestingly, upon performing the subtraction, the $4^{th}$ order Bragg resonance is easily observable at 768 nm. Considering that the grating pitch A in the fiber is 0.8735 µm, the effective indicies $n_{eff}$ of the sapphire at the $2_{nd}$, $3^{rd}$ and $4^{th}$ order resonances can be determined from the Bragg condition of eq. 1, and are 1.744, 1.755 and 1.759 for the $2^{nd}$, $3^{rd}$ and $4^{th}$ orders respectively. These values for the $n_{eff}$ of sapphire are consistent with the ordinary refractive indicies of sapphire (electric field perpendicular to the c-axis) that is specified by Gervais "Aluminum Oxide ($Al_2O_3$)", in *Handbook of Optical Constants of Solids*, vol. 2, E. D. Palik, Ed., San Diego: Academic Press, 1991, pp. 761-775, incorporated herein by reference, namely 1.746, 1.755 and 1.761 at 1550, 1033 and 775 nm respectively. The bandwidths of the spectral responses from the gratings revealed by the trace subtraction are much broader than Bragg resonances measured in reflection directly with a source that is coupled into the fiber. The transition is sharper on the long wavelength side that is coincident with the Bragg resonance. As the black body radiation is radiated isotropically, it is possible that short lived extremely high order modes are excited within the fiber which are then reflected by the grating at shorter wavelengths.

Since the sapphire optical fiber is absent a cladding layer, there is some evanescent coupling of guided radiation outside of the fiber. Changes to the refractive index of the surrounding environment will result in changes to the effective index seen by modes guided within the fiber.

Figure 15:
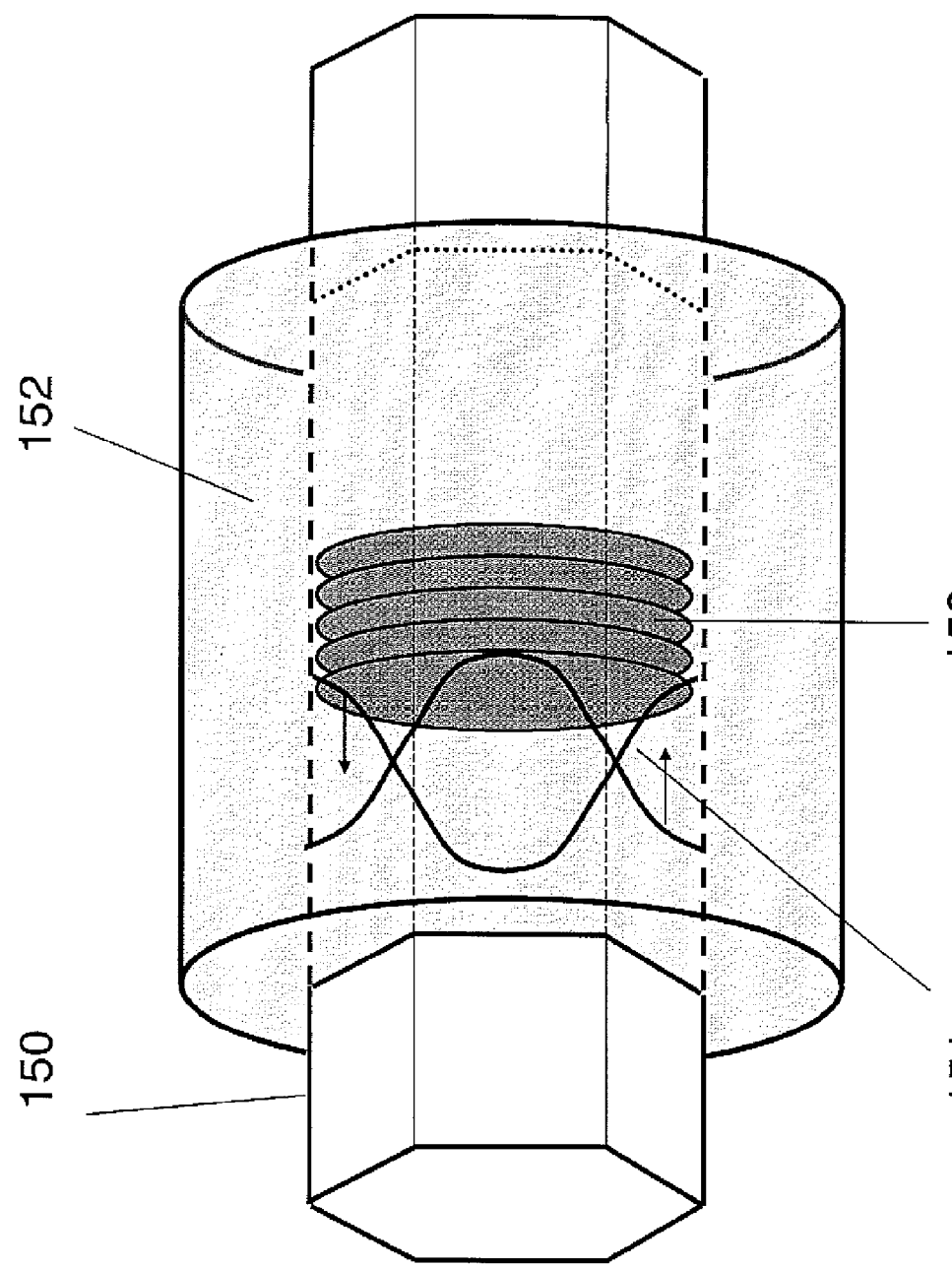
FIG. 15 is a schematic figure of a sapphire based chemical sensor with a sensing layer.

Placing a thin layer of a dissimilar material on the surface of the sapphire fiber will change the effective index seen by guided modes near said thin layer. If the thin layer changes its refractive index when exposed to different chemicals, changes to the effective index of guided modes near the layer will also occur. As the resonant wavelength reflected by a Bragg grating is dependent on the local effective index of the sapphire fiber, variation in effective index caused by exposure of the thin layer to different chemicals will result in a chemically dependent wavelength shift of the Bragg resonance. In FIG. 15, the low order mode field 151, which propagates along the sapphire fiber 150, couples evanescently into the sensing layer 152, which changes locally the effective index of the fiber about which the sensing layer is placed, hence the wavelength reflected by the grating 153. For room temperature devices, there are various polymer coatings etc that can detect different hydrocarbons. Some metals, like palladium, change the effective index seen by the guided mode in the fiber, see for example Maier et al. J. Opt. A: Pure Appl. Opt. 9 (2007), S45-S59, incorporated herein by reference. Palladium has a high melting point of 1559° C. Coating the region of the sapphire fiber that contains a grating with thin layers of palladium could allow the sapphire fiber Bragg grating to be used as a sensor for hydrogen.

In a broad aspect of the invention, a method of determining a value of a parameter is provided which includes:

providing a high temperature sensor capable of withstanding a temperature of at least 650 deg C., wherein the sensor includes a wavelength dependent element such as a Bragg grating;

placing the high temperature sensor at a location where a black body radiation is generated about the wavelength dependent element wherein the black body temperature does not exceed the glass transition temp for the wavelength dependent element;

detecting a composite signal which includes black body radiation and a signal reflected from the wavelength dependent element; and decoupling the detected black body radiation and the detected signal from the sensor element to determine the value of the parameter.

The foregoing steps can be executed using an detector which is an optical spectrum analyzer. For measurement of Bragg gratings, high spectral resolution is required and the obtained signal level is low. For measuring Black Body radiation, low spectral resolution is required and a high signal level is obtained.

The following detailed steps are performed to determine the value of the parameter, for example strain.

Step 1: sensor calibration:
Step 1a): set resolution of spectrum analyzer to low resolution thus increasing signal strength
Step 1b): place sensor in heat source, (microfurnace) with known temperature >650 C
Step 1c): obtain baseline broadband spectrum of spectral emittance
Step 1d): using computer, determine area under the broadband spectrum curve to obtain integrated signal level, correlate with reference temperature.

Step 2: Performing a dual/parameter measurement:
Step 2a): place sensor in area to be measured
Step 2b): set resolution of spectrum to low resolution
Step 2c): obtain broadband spectrum
Step 2d): using computer, determine area under the broadband spectrum curve to obtain integrated signal level
Step 2e): Normalize integrated signal level against level found in Step 1d)
Step 2e): Using equation 2, determine temperature from change in integrated spectral emittance, save this value as the temperature
Step 2f): knowing the period of the Bragg grating, the effective index of sapphire, the temperature and that the wavelength shift due to temperature is 26 pm/° C. for sapphire, the wavelength shift due to temperature alone can be calculated.

Step 2g): set resolution of spectrum analyzer to high resolution, set wavelength range of unit to be near Bragg resonance.

Step 2h): obtain reflection spectrum of the Bragg grating, note the wavelength of the Bragg resonance.

Step 2i): subtract the value of the measured Bragg resonance from the Bragg resonance calculated in step 2f). Obtained value in wavelength shift is due to the parameter being measured (for example strain)

In an aspect of this invention, a method is provided wherein the black body radiation is generated in an optical waveguide outside of the wavelength dependent element and about the wavelength dependent element at two separate locations. In this instance, the steps above are modified in the following manner:

Step 1: sensor calibration: same as above with reference heat source placed outside the wavelength dependent element Step 2: Performing a dual/parameter measurement:

Step 2a): place sensor in area to be measured

Step 2b): set resolution of spectrum to low resolution

Step 2c): place black body radiation source on far side of the grating (location C)

Step 2d): obtain broadband spectrum, save it on the computer

Step 2e): place black body radiation source on near side of the grating (location A)

Step 2f): obtain broadband spectrum, save it on the computer

Step 2g): using computer, subtract spectrum taken in step 2d) from spectrum taken in step 2f).

Step 2h): Using a peak detection algorithm, identify signal levels of Bragg resonance peak and then signal levels of valley on long wavelength side of the resonance. Mid point represents the Bragg resonance of fundamental waveguide order (white plus sign in FIG. 13)

What is claimed is:

1. A method of determining a value of a parameter comprising:
    a) providing a high temperature sensor capable of withstanding a temperature of at least 650degrees C., wherein the sensor includes a wavelength dependent element;
    b) placing the high temperature sensor at a location where a black body radiation is generated about the wavelength dependent element wherein the black body temperature does not exceed the glass transition temperature for the wavelength dependent element;
    c) detecting black body radiation by the sensor at a location a distance away from the sensor and determining a temperature value from said radiation;
    d) detecting a signal from the wavelength dependent element which corresponds to a wavelength dependent shift corresponding to the temperature and a wavelength shift due to the parameter;
    e) using the value of the temperature determined in step (c) to calculate a wavelength shift due to temperature variation;
    f) subtracting the wavelength shift due to temperature variation from the wavelength shift from the wavelength dependent element to determine a wavelength shift due to the parameter; and
    g) determining the value of the parameter due to the determined wavelength shift due to the parameter.

2. A method as defined in claim 1, wherein the wavelength dependent element is a grating within an optical waveguide which couples light from the grating to a detector.

3. A method as defined in claim 2, wherein the parameter corresponds to at least one of strain, bend, pressure, and chemical composition in a region about the sensor.

4. A method as defined in claim 2, wherein the grating is a Bragg grating and wherein the black body radiation and the signal from the wavelength dependent element are in the form of a composite signal.

5. A method as defined in claim 4, wherein the Bragg grating is formed in a crystalline material having a glass transition temperature of over 2000° C.

6. A method as defined in claim 1, further comprising the step of launching light from a laser or broadband optical source for providing an optical probe signal into an optical fiber toward the wavelength dependent element to generate at least a portion of the signal detected in step (d).

7. A method as defined in claim 6, wherein the optical fiber is a single mode fiber and wherein the wavelength dependent element is a Bragg grating formed within a single mode waveguide coupled to or integral with the single mode optical fiber.

8. A method as defined in claim 1 wherein calibration of the sensor is performed prior to executing step (e).

9. A method as defined in claim 4, wherein a region about ends of the Bragg grating are heated, and wherein a measurement of a received signal including black body radiation from each of said regions is compared to provide a difference signal that is used to provide the value of the parameter.

10. A method as defined in claim 4, wherein the decoupling is performed by monitoring wavelength shifts of diffracted orders within the detected signal from the sensor element.

11. A method as defined in claim 1, wherein the black body radiation is generated in the wavelength dependent element.

12. A method as defined in claim 3 wherein the detecting steps (d) and (e) are performed by the detector.

13. A method as defined in claim 4 wherein the composite signal corresponds to temperature and one of strain, bend, pressure, and chemical composition in a region about the sensor.

* * * * *